United States Patent

Patchett

[11] Patent Number: 6,125,629
[45] Date of Patent: Oct. 3, 2000

[54] STAGED REDUCTANT INJECTION FOR IMPROVED $NO_X$ REDUCTION

[75] Inventor: Joseph A. Patchett, Basking Ridge, N.J.

[73] Assignee: Engelhard Corporation, Iselin, N.J.

[21] Appl. No.: 09/191,779

[22] Filed: Nov. 13, 1998

[51] Int. Cl.[7] .................................................. F01N 3/00
[52] U.S. Cl. .......................... 60/286; 60/284; 60/303; 60/295
[58] Field of Search ............................... 60/286, 274, 284, 60/295, 302, 303; 422/172, 182, 183, 148

[56] References Cited

U.S. PATENT DOCUMENTS

| | | |
|---|---|---|
| 3,599,427 | 8/1971 | Jones et al. ................................ 60/303 |
| 4,188,364 | 2/1980 | Gladden . |
| 4,403,473 | 9/1983 | Gladden . |
| 4,707,341 | 11/1987 | Koch et al. ............................. 422/171 |
| 4,751,054 | 6/1988 | Watanabe . |
| 4,828,806 | 5/1989 | Flockenhaus et al. . |
| 4,842,834 | 6/1989 | Burton . |
| 4,946,659 | 8/1990 | Held et al. . |
| 4,961,917 | 10/1990 | Byrne . |
| 5,024,981 | 6/1991 | Speronello et al. . |
| 5,116,579 | 5/1992 | Kobayashi et al. . |
| 5,189,876 | 3/1993 | Hirota et al. . |
| 5,224,346 | 7/1993 | Berriman et al. . |
| 5,285,640 | 2/1994 | Olivo . |
| 5,369,956 | 12/1994 | Daudel et al. . |
| 5,388,406 | 2/1995 | Takeshima et al. ....................... 60/297 |
| 5,397,545 | 3/1995 | Balling et al. . |
| 5,406,790 | 4/1995 | Hirota et al. .............................. 60/276 |
| 5,435,976 | 7/1995 | Berner et al. . |
| 5,491,120 | 2/1996 | Voss et al. . |
| 5,516,497 | 5/1996 | Speronello et al. . |
| 5,551,231 | 9/1996 | Tanaka et al. ............................ 60/289 |
| 5,628,186 | 5/1997 | Schmelz . |
| 5,643,536 | 7/1997 | Schmelz . |
| 5,765,370 | 6/1998 | Hanafusa et al. . |
| 5,788,936 | 8/1998 | Subramanian et al. . |
| 5,996,338 | 12/1999 | Hirota ...................................... 60/285 |

FOREIGN PATENT DOCUMENTS

| | | |
|---|---|---|
| 0 487 886 B1 | 10/1991 | European Pat. Off. . |
| 0 515 857 B1 | 4/1992 | European Pat. Off. . |
| 0 554 766 B1 | 1/1993 | European Pat. Off. . |
| 42 14 183 A1 | 6/1993 | Germany . |
| 43 38 883 A1 | 5/1994 | Germany . |
| 44 32 576 A1 | 9/1994 | Germany . |
| WO 94/27035 | 11/1994 | WIPO . |
| WO 98/39083 | 9/1998 | WIPO . |

OTHER PUBLICATIONS

Manfred Koebel, Martin Elsener and Thomas Marti, NOx–Reduction in Diesel Exhaust Gas with Urea and Selective Catalytic Reduction, Combustion Technology Division, Paul Scherrer Institute (PSI), Switzerland, Received Jul. 24, 1996, CCombus. Sci. and Tech., 1996 vol. 121, pp. 85–102.

*Primary Examiner*—Thomas Denion
*Assistant Examiner*—Binh Tran
*Attorney, Agent, or Firm*—Richard A. Negin

[57] ABSTRACT

An external reductant for an SCR vehicular $NO_x$ emission control system is selectively injected to SCR catalysts which are only at catalytically active temperatures thereby avoiding reductant absorption in catalytically unactive catalysts and improving conversion response time.

6 Claims, 6 Drawing Sheets

STAGED REDUCTANT INJECTION FOR IMPROVED $NO_x$ REDUCTION

This invention relates generally to a system (method and apparatus) for removing noxious emissions from the exhaust gases of a vehicle's internal combustion engine and more particularly to the reduction of nitrogen oxides to free nitrogen.

The invention is particularly applicable to and will be described with specific reference to a system for the removal of nitrogen oxides from diesel engines operating at lean air/fuel ratios promoting the formation of $NO_x$. However, those skilled in the art will understand that the invention has broader application and could be applied, for example, to gasoline fueled engines operated under lean burn conditions.

INCORPORATION BY REFERENCE

The following documents are incorporated by reference herein and made a part hereof so that details known to those skilled in the art need not be restated when explaining the invention. The following documents however are not part of the present invention.

1) U.S. Pat. No. 4,961,917, issued Oct. 9, 1990 to Byrne, entitled "Method for Reduction of Nitrogen Oxides with Ammonia using Promoted Zeolite Catalysts";
2) U.S. Pat. No. 5,189,876, issued Mar. 2, 1993 to Hirota et al., entitled "Exhaust Gas Purification System for an Internal Combustion Engine";
3) U.S. Pat. No. 5,224,346, issued Jul. 6, 1993 to Berriman et al., entitled "Engine $NO_x$ Reduction System";
4) U.S. Pat. No. 5,491,120, issued Feb. 13, 1996, entitled "Oxidation Catalyst with Bulk Ceria, a Second Bulk Metal Oxide, and Platinum";
5) U.S. Pat. No. 5,516,497, issued May 14, 1996 to Speronello et al., entitled "Staged Metal-Promoted Zeolite Catalysts and Method for Catalytic Reduction of Nitrogen Oxides using the Same";
6) U.S. Pat. No. 5,788,936, issued Aug. 4, 1998 to Subramanian et al., entitled "Catalyst System for Converting Emissions of a Lean-Burn Engine".

BACKGROUND

It is well known that diesel engines which operate lean (i.e., defined to mean an air to fuel ratios above stoichiometric or lambda in excess of 1) and gasoline engines employing "lean burn" fueling strategies promote the formation of nitrogen oxides ($NO_x$) in the products of combustion. One well known method for converting the $NO_x$ to harmless emissions, and the method to which this invention relates, is the introduction of a reductant, such as ammonia, to the exhaust gas stream containing $NO_x$. The exhaust stream with the reductant, is contacted with a catalyst at elevated temperature to catalyze the reduction of nitrogen oxides with ammonia. This catalyzed reaction is referred to as the selective catalytic reduction ("SCR") of nitrogen oxides. The excess or residual ammonia present in the exhaust gas after SCR is released to the environment as $NH_3$ slip or reacted with oxygen to form nitrogen, $H_2O$ and possibly $NO_x$ across an oxidizing catalyst. Ammonia oxidation and SCR are competing reactions with the predominance of one over the other being controlled to some extent by the catalyst composition. See assignee's U.S. Pat. No. 5,516,497 to Speronello et al. and U.S. Pat. No. 5,024,981 to Speronello et al.

Figure 1A:
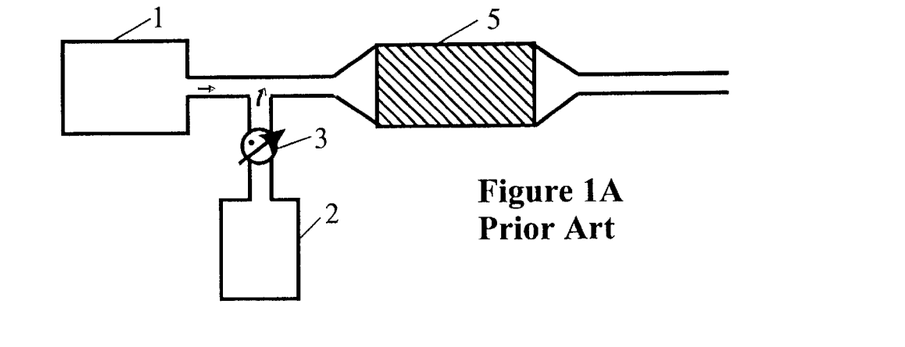
FIGS. 1A and 1B are block schematic diagrams of prior art SCR systems supplied with an external reducing agent.

This arrangement is conceptually illustrated in FIG. 1A in which an engine 1, operated at lean conditions, produces exhaust gases into which a reductant 2, such as ammonia, is metered by valve 3. The stream of reductant and exhaust gases pass through a SCR catalyst 5 and then pass through an oxidizing catalyst (not shown) where hydrocarbons (HC), carbon monoxide (CO) and residual or excess ammonia are oxidized. This is the typical arrangement such as illustrated in U.S. Pat. No. 4,946,659 to Held et al., U.S. Pat. No. 5,189,876 to Hirota et al.; U.S. Pat. No. 5,224,346 to Berriman et al.; and U.S. Pat. No. 5,788,936 to Subramanian et al.

Emission regulations impose a limit on the quantity of specific emissions, including $NO_x$, that a vehicle can emit during a specified drive cycle such as an FTP ("federal test procedure") in the United States or an MVEG ("mobile vehicle emission group") in Europe. These driving cycles specify an engine cold start. Catalytic converters, however, are most effective at elevated temperatures. The emissions produced by the engine while it warms to operating temperature can comprise a substantial portion of the total emissions produced during the entire drive cycle. To address this requirement emission systems employ several catalysts which are catalytically active at different temperature ranges. Insofar as SCR catalysts are concerned, a precious metal containing catalyst is catalytically active at lower temperatures compared to those formed with base metal oxides or zeolites.

Figure 1B:
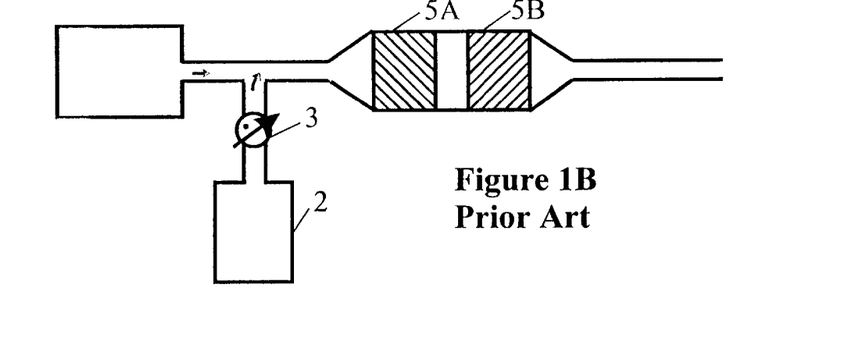

A typical arrangement is illustrated in FIG. 1B which is similar to that shown in FIG. 1A except that SCR catalyst 5 now comprises a high temperature SCR catalyst 5A and a low temperature SCR catalyst 5B. As with FIG. 1A, an oxidizing catalyst downstream of SCR catalysts 5A and 5B can be provided. SCR catalysts 5A and 5B can be separate catalysts or separate beds within one catalyst and the oxidizing catalyst (not shown) could be configured as a separate end bed within one catalytic converter. While the placement of high and low temperature SCR catalysts can be varied, when an external reductant is added to the system, the high temperature SCR catalyst 5A is placed before the low temperature SCR catalyst. If the SCR positions were reversed, when the engine reaches normal operating temperature, the low temperature SCR's operating range or window is exceeded, and the ammonia will react with oxygen in the exhaust gas to produce $N_2$ and $H_2O$ or conceivably $NO_x$. The SCR reaction with $NO_x$ to produce $N_2$ and $H_2O$ will not occur.

The configuration illustrated in FIG. 1B is specifically developed to minimize $NO_x$ emissions following cold start of the vehicle and represents a significant improvement over conventional systems illustrated in FIG. 1A. Nevertheless tests, as discussed below, have shown that the system is not responsive in a timely manner to reduce $NO_x$ during engine warmup following cold start. That is when the low temperature SCR catalyst operating temperature is reached during engine warm up, the low temperature SCR catalyst is not instantaneously reducing $NO_x$. There is a time lag. Further, the system of FIG. 1B under certain load or driving conditions of the vehicle, and after the vehicle has reached operating conditions, may be ineffective to quickly respond to operating temperature variations to reduce $NO_x$.

SUMMARY OF THE INVENTION

Accordingly, it is a principal object of the invention to provide a vehicular emission system (method and apparatus), which uses multiple SCR catalysts effective at different operating temperatures with an external reducing agent, that quickly responds to engine operating conditions to more effectively reduce $NO_x$ emissions than heretofore possible.

This object along with other features of the invention is achieved by a system (method and apparatus) for reducing $NO_x$ emissions in the exhaust gases of an internal combustion engine, particularly when the engine is in a warm up condition following cold-start which includes a first catalyst downstream of the engine over which the exhaust gas stream passes and which is effective in the presence of a reductant to substantially reduce $NO_x$ when the first catalyst is at a first temperature range. The exhaust gases also pass over a second catalyst downstream of the first catalyst before discharge to atmosphere and the second catalyst is also effective to substantially reduce $NO_x$ in the presence of a reductant when the second catalyst is at a second, different temperature range than the first. A reducing agent is provided by a metering arrangement that, in response to a command signal, injects the reducing agent into the exhaust stream either i) upstream of the first catalyst, or ii) upstream of the second catalyst but downstream of the first catalyst, or iii) upstream of the first catalyst and simultaneously, upstream of the second catalyst. The result is that the reducing agent combined with the exhaust gases passes over a catalyst in its active temperature region.

In accordance with another feature of the invention, the command signal is a temperature based signal, either modeled or sensed, indicative of the temperature of the first and second catalysts and the metering reducing agent arrangement injects the reducing agent only to that catalyst which is within its reducing temperature range whereby the reducing agent is not absorbed in a catalytically inactive catalyst delaying the system conversion response time or oxidized by a catalyst at a temperature higher than its catalytically active range resulting in a wastage of the reducing agent.

In accordance with a specific feature of the invention, the first catalyst is a close coupled SCR catalyst catalytically active at a low temperature range consistent with initial start-up and typical urban driving conditions. The second catalyst is an SCR catalyst catalytically active at higher temperature ranges consistent with higher engine operating temperatures in highway or high speed operation. The command signal injects the reducing agent only to the first catalyst during warm up of the engine following cold start and switches the reducing agent injection only to the second catalyst after the engine has substantially completed its warm up whereby the system effectively reduces $NO_x$ emissions following engine cold-start by converting $NO_x$ emissions to harmless emissions as soon as the close coupled catalyst reaches its catalytically active temperature range.

In accordance with yet another specific, but important, feature of the invention, the command signal controlling the reducing agent injection is derived from the $NO_x$ content of the exhaust gas, the space velocity of the exhaust gases and the temperature of the exhaust gases so that variations in engine load and engine temperature occurring during normal engine operation result in a metered reducing agent injection to only that catalyst(s) which is catalytically active to reduce $NO_x$ for that engine operating condition. Consequently, the system efficiently and effectively converts $NO_x$ emissions throughout the operating range of the engine.

Yet another feature of the invention flowing from the general inventive concept is that the metering rate of the reducing agent, while constant in the preferred embodiment and selected at a rate sufficient to reduce the quantity of $NO_x$ produced at that time by the engine, can be varied over the catalytically active operating temperature range of the SCR catalyst which is selected for injection so that the quantity of injected reducing agent is matched to the ability of the SCR catalyst to reduce $NO_x$ which to some extent is correlated to its precise temperature within its set range whereby reducing agent usage is conserved.

Yet another distinct feature of the invention resulting from its broad inventive concept is the use of the system in a single catalyst bed which injects the reductant to that portion of the bed which has attained a catalytically active temperature whereby the system can be utilized in systems employing a single SCR catalyst. Specifically, fixed reductant injectors located near the bed entrance, midway in the bed and near the bed exit are actuated as the bed temperature is increased from entrance to exit during warm up and thereafter are selectively communicated with bed portion at catalytically active temperatures.

It is a general object of the invention to provide a system (method and apparatus) to substantially convert $NO_x$ gaseous emissions produced by an internal combustion engine.

It is another object of the invention to provide a system for substantially converting NO emissions produced by an internal combustion engine to harmless emissions in a fast, timely manner during warm up of the engine following cold start as well as timely converting $NO_x$ emissions during temperature changes after the engine has reached operating temperature.

Yet another object of the invention is to provide a system for reducing a higher percentage of $NO_x$ emissions produced by diesel combustion engines than heretofore possible. Still another object of the invention is to provide an emission system particularly suited for diesel combustion engines which selectively applies an external reductant to catalyst beds that are catalytically active at different temperatures to assure timely and substantial $NO_x$ reduction over the entire operating range of the engine.

Yet another object of the invention is to provide a system which supplies a reductant to selective catalysts having different catalytically active temperature limits depending on sensed engine operating conditions to assure substantial reduction of $NO_x$ during normal operating conditions of the engine after engine warm up.

A still further object of the invention is to provide an improved SCR catalyst system with external reducing agent or reductant for reducing $NO_x$ emissions produced by diesel and lean burn gasoline engines using several SCR catalysts which are catalytically active at different operating temperature ranges, each of which is instantaneously activated when and as the engine causes the activated SCR catalyst to fall within its catalytically active temperature range and which is deactivated when the engine causes the SCR catalyst to fall outside its catalytically active temperature range.

An important object of the invention to provide an SCR catalyst system for diesel and lean burn gasoline engines which minimizes the use of an external reducing agent or reductant.

A still further and specific object of the invention is to provide an improved SCR system using only one SCR catalyst.

These objects and other features of the invention will become apparent to those skilled in the art from the following Detailed Description of the Invention taken together with the accompanying drawings.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF THE INVENTION

In order that the invention be described in a consistent manner, the following terms, words or expressions shall have the meanings ascribed them when used in this Detailed Description and in the claims of the invention:

"SCR" means a selective catalytic reduction in which a catalyzed reaction of nitrogen oxides with a reductant occurs to reduce the nitrogen oxides, i.e., to $N_2$, $N_2O$. The reductant can be supplied externally, internally or through a combination of external and internal sources since hydrocarbons within the exhaust gases can function as a reducing agent. As explained later, an SCR catalyst, while reducing when reacting with $NO_x$ is not necessarily solely a reducing catalyst. Oxidation reactions can occur.

"Cold-start" means when the temperature of the engine and catalysts are at ambient temperature.

"Warm up" means the time it takes the engine and the emission systems to achieve normal operating conditions from cold-start.

"Catalytically active" means with respect to an SCR catalyst, the combination of space velocity, temperature and $NO_x$ concentration at which the catalyst in the presence of a reductant begins to significantly reduce $NO_x$ emissions passing over the catalyst. "Significantly reduce" for purposes of this invention means a reduction of about 50% of the $NO_x$ emissions as determined by steady state testing using $NH_3$ as a reductant.

"Catalytically active temperature" means the temperature range at which an SCR catalyst is catalytically active. If the SCR catalyst is below the temperature range it will not reduce $NO_x$ in any significant quantity. If the SCR catalyst is above the catalytically active temperature, it will oxidize the reductant. As is well known, if the exhaust gas temperature is significantly above the catalytically active temperature, the reductant can form $NO_x$. See for example U.S. Pat. No. 5,224,346 to Berriman et al. incorporated herein by reference.

"Reductant" or "reducing agent" are used synonymously herein to mean any chemical or compound tending to reduce $NO_x$ at elevated temperature. In the preferred embodiment of the invention, the reducing agent is ammonia, specifically an ammonia precursor, i.e., urea. (As is well known, urea ($H_2N-CO-NH_2$) readily hydrolyzes to $CO_2$ and $2NH_3$). However, the invention contemplates any form of reducing agent or reductant so that the term includes not only ammonia and/or ammonia precursors but also fuel, particularly diesel fuel and fractions thereof as well as any hydrocarbon. In particular the reductant or reducing agent may be selected from hydrocarbons and oxygenated hydrocarbons falling within the group consisting of alkanes, alkenes, alkynes, alcohols, esters, ketones, ethers, aldehydes and aromatics. More specifically, fuel oil cracked with or without air to produce lower order hydrocarbons such as propylene, propane, ethene, ethane, acetylene butadiene and propanol are intended to be included within the definition of reductant and reducing agent. Preferably, the reducing agent or reductant is in gaseous form. However, the reducing agent can be injected in liquid form into the exhaust gases if the exhaust gases are at sufficient temperature.

Referring now to the drawings wherein the showings are for the purpose of illustrating a preferred embodiment of the invention only and not for the purpose of limiting same, FIG. 1B, as described in the Background, illustrates a preferred SCR catalyst arrangement for reducing $NO_x$ emissions. In that arrangement, SCR catalysts having different catalytically active temperatures are used in the emission system so that $NO_x$ emissions produced during warm up of the vehicle as well as $NO_x$ emissions produced when the engine is at normal operating temperatures can be reduced to satisfy emission requirements. This invention uses the same SCR catalysts as that of the prior art. While the SCR catalysts are necessary to practice the invention, they are not per se the invention in that special SCR catalysts do not have to be developed to practice the invention. The composition of such catalysts are believed known and will not be described in detail herein. Reference can be had to assignee's U.S. Pat. No. 4,961,917 to Byrne and U.S. Pat. No. 5,516,497 to Speronello et al., incorporated by reference herein for a more detailed description of such catalysts. Many SCR catalysts contain a zeolite. The zeolite (high temperature) or zeolite with precious metal (low temperature) is typically applied as a washcoat on a monolithic carrier having a plurality of fine gas flow passages through which the exhaust gases pass.

For purposes of describing the invention, the high temperature SCR catalyst shown by reference numeral 5A in FIG. 1B has a catalytically active temperature range of about 280 to 600 degrees Centigrade. The low temperature SCR catalyst shown by reference numeral 5B in FIG. 1B has a catalytically active temperature of about 100 to 300 degrees Centigrade. Note there is an overlap of temperatures within each SCR's catalytically active temperature range. This is a general range. Specific low temperature and/or high temperature SCR's may have tighter or closer temperature ranges falling within the general ranges cited.

Figure 4:
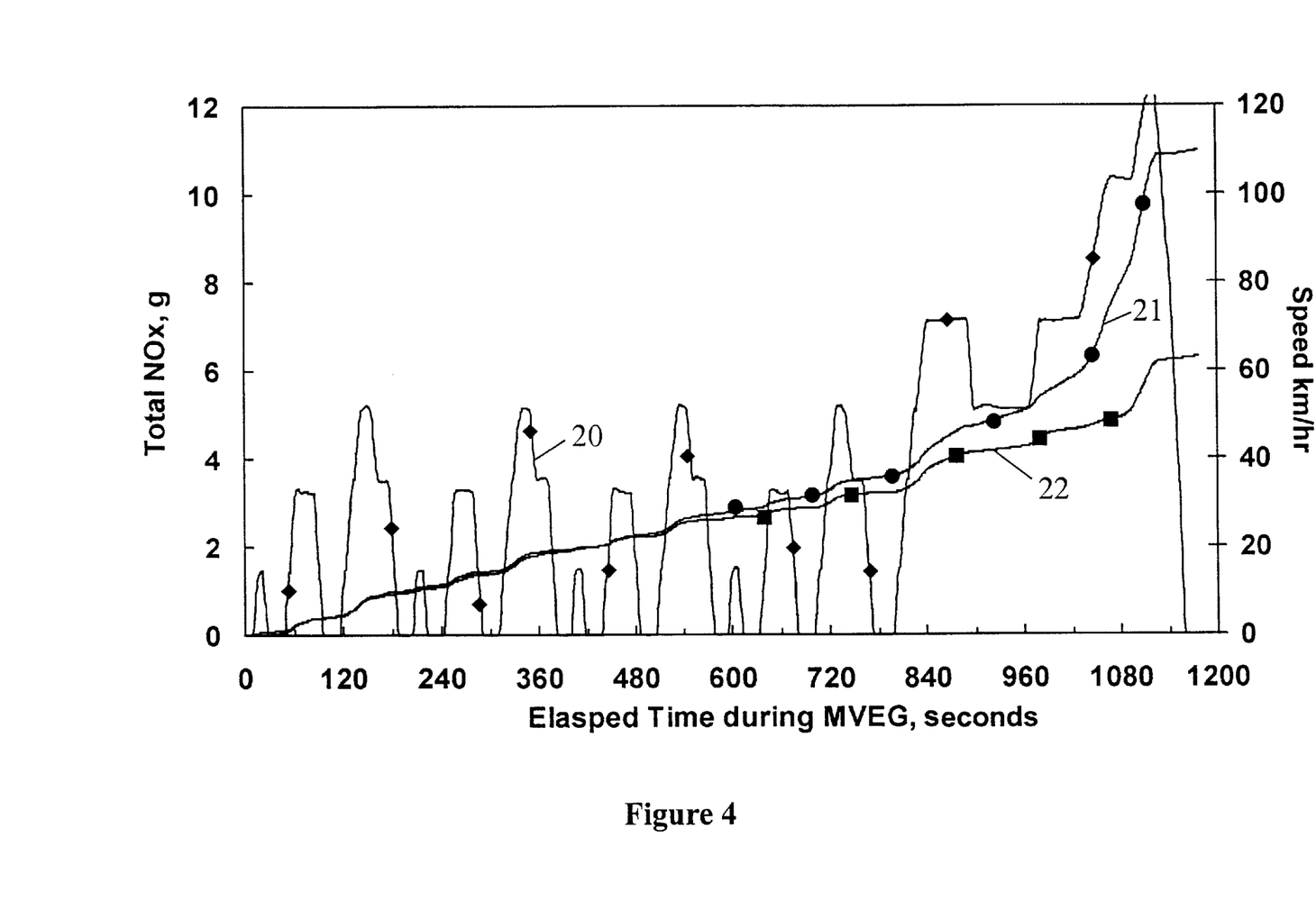
FIG. 4 is a graph showing the accumulative engine out $NO_x$ emissions as a function of time during the start portion of a drive cycle.

Referring now to FIG. 4, there is shown several plots of data taken during a MVEG (mobile vehicle emission group) drive cycle, specifically the ECE portion thereof (which represents city/urban driving from cold start). The data was taken from a 2.5 liter direct inject Ford Transit diesel engine equipped with SCR catalysts in the configuration shown in FIG. 1B with urea used as the reducing agent. The high temperature catalyst 5A was an Engelhard catalyst supplied under the Engelhard brand name ZNX® described above and the low temperature SCR catalyst 5B was an Engelhard catalyst supplied under the Engelhard brand name NOX-CAT® described above. Plotted on the x-axis is time in seconds from cold start of the engine. Two scales are plotted on the y-axis. On one scale, shown at the right hand side of the graph, is vehicle speed, dictated by the drive cycle in km/hr. The other y-axis scale is the cumulative total $NO_x$ emitted by the engine in grams. The vehicle's speed is shown by the trace passing through triangles indicated by reference numeral 20 in FIG. 4. The $NO_x$ emissions produced by the vehicle's products of combustion and upstream of SCR catalysts 5A and 5B is shown by the trace passing through circles and indicated by reference numeral 21 in FIG. 4. The $NO_x$ emissions downstream of SCR catalysts 5A and 5B which are exhausted to atmosphere are shown by the trace passing through squares and indicated by reference numeral 22 in FIG. 4. What FIG. 4 clearly shows is that, despite the presence of staged SCR catalysts, the prior art is unable to reduce $NO_x$ emissions until after about eight minutes have elapsed in the driving cycle. This is totally unexpected since low temperature SCR catalyst 5B is ideally suited for conversion of $NO_x$ at temperatures which occur earlier than 8 minutes into the drive cycle. The catalyst bed temperature is well within the catalytically active temperature of SCR catalyst 5B when the vehicle is 8 minutes into the driving cycle.

During a number of laboratory tests undertaken to examine how the discrepancy between theoretical and practical results demonstrated in FIG. 4 occurred, it was noted that the high temperature SCR catalyst 5A was influencing the low temperature SCR catalyst 5B. The conclusion was reached that the apparent poor performance of the second, low temperature SCR catalyst 5B, occurs because the reducing agent is being absorbed on the first, high temperature SCR catalyst 5A preventing the reducing agent from reaching the second, low temperature SCR catalyst 5B. This conclusion, which forms one of the underpinnings of the invention, is verified by FIG. 5.

Figure 5:
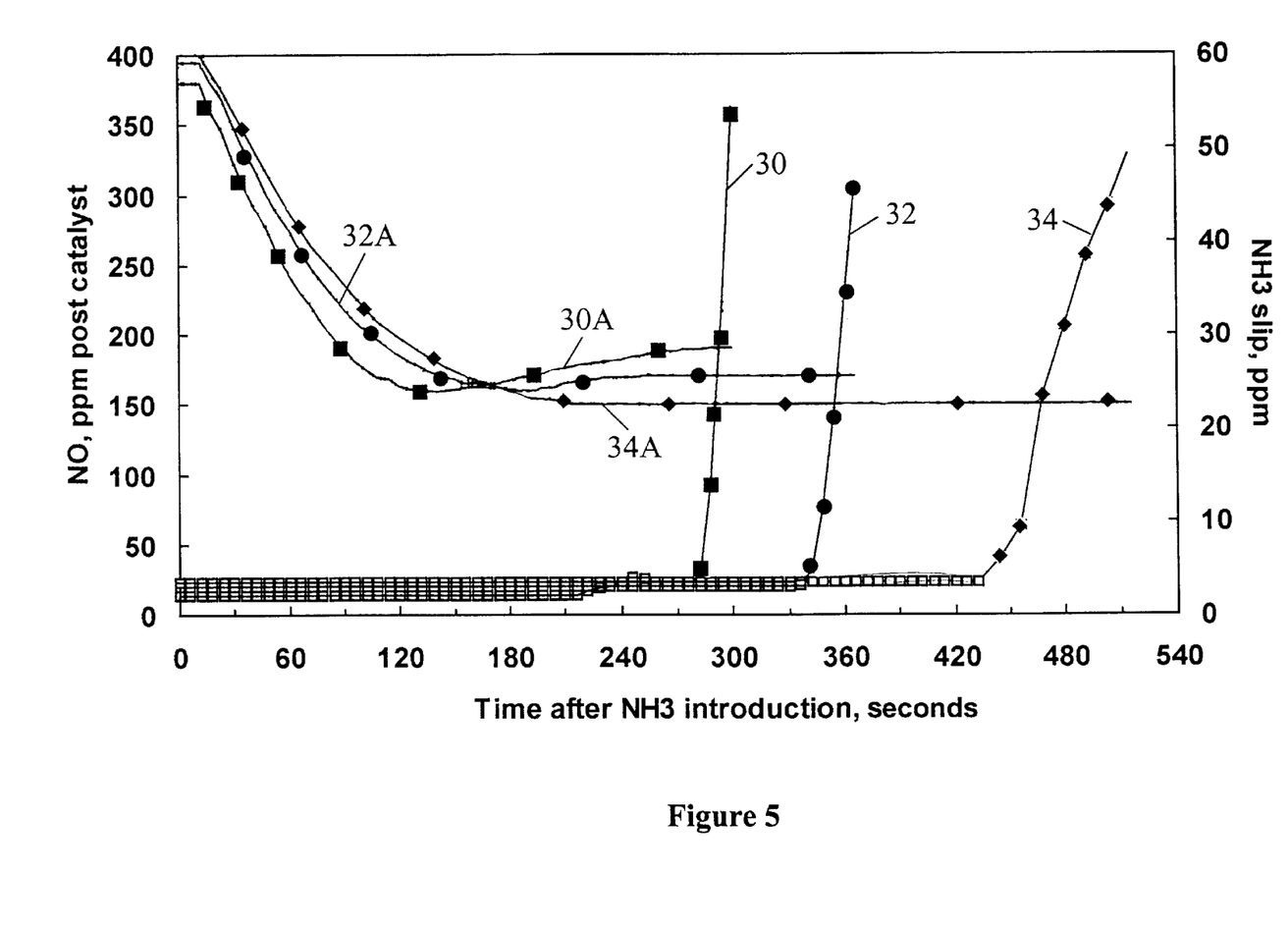
FIG. 5 is graphs of a series of experiments that show the effects of amplitude ammonia steps (varying levels of ammonia) inputted into a high temperature catalyst.

FIG. 5 plots the results of laboratory tests of gas analysis in which synthetic gases simulating exhaust gases are analyzed. The condition analyzed is equivalent to the condition of the exhaust gas at the exit of high temperature catalyst 5A and before entering low temperature catalyst 5B as shown in FIG. 1B. A series of three tests were run from initial conditions of a constant space velocity of 60,000 hr.$^{-1}$ with 500 ppm NO, 100 ppm $NH_3$, 300° C. and with 10% $O_2$ and $H_2O$. The high temperature catalyst was the same catalyst referred to above, i.e., an Engelhard ZNX® catalyst having 300 cells per square inch of zeolite. From the initial conditions, ammonia was increased to 500 ppm which produced traces indicated by squares in FIG. 5. The initial conditions were then reestablished and the ammonia was metered at a rate of 600 ppm (parts per million) with the results shown by traces passing through circles in FIG. 5. Again, the initial conditions were reestablished and the ammonia was metered at a rate of 800 ppm with the results shown by the traces passing through triangles in FIG. 5.

Referring still to FIG. 5, the x-axis is a plot of time commencing with the introduction of ammonia at the rates indicated above. On the y-axis, two scales are plotted. At the right hand side of the graph, the y-axis scale shows the concentration of $NH_3$ present in the exhaust stream after passing through high temperature SCR catalyst 5A. At the y-axis shown on the left hand side of FIG. 5 the concentration of NO downstream of high temperature SCR catalyst 5A is plotted. The vertically extending plots dramatically verify the conclusion that high temperature SCR catalyst 5A stores the ammonia. The vertically extending curve designated by reference numeral 30 passing through squares in FIG. 5 indicates that the high temperature SCR catalyst absorbed the 800 ppm ammonia stream for about 275 seconds until ammonia began to again appear as a slip stream. Further, when the ammonia began to appear, the slip stream content increased dramatically indicating that the high temperature SCR catalyst had reached its absorption limit. The 600 ppm ammonia slip stream is indicated by reference numeral 32 passing through circles. It took about 340 seconds for the lesser concentration of ammonia to be absorbed by high temperature SCR catalyst 5A. As with the 800 ppm ammonia stream, the 600 ppm curve dramatically increases once high temperature SCR catalyst 5A reaches its absorption limit. Finally, the plot indicated by reference numeral 34 passing through diamonds shows that it took about 425 seconds for high temperature SCR catalyst 5A to reach its absorption limit. Further, at the lower rate of ammonia indicated by plot 34, the ability of high temperature SCR catalyst 5A to store the ammonia may be slightly increased to account for the difference in the slope of plot 34 compared to plots 30 and 32. Plots 30, 32 and 34 clearly demonstrate that high temperature SCR catalyst 5A does, in fact, absorb the ammonia. The result is that the high temperature SCR catalyst 5A delays the time for the ammonia to reach low temperature SCR catalyst 5B which is catalytically active at 300° C. whereas the specific high temperature SCR catalyst 5A is not catalytically active at this temperature. Also plotted is the nitrous oxide content of the exhaust gas passing through high temperature SCR catalyst 5A for the 500, 600, and 800 ppm ammonia streams which are designated respectively as 30A, 32A, and 34A. Plots 30A, 32A, and 34A are all somewhat similar and show a reduction in nitrous oxide while high temperature SCR catalyst 5A is storing the ammonia. The reduction in nitrous oxide is attributed to reaction of ammonia with the exhaust gases at 300° C. Plots 30A, 32A and 34A are shown to demonstrate that the reducing reactions, although not naturally occurring at the high uncatalyzed temperature whereat complete reduction occurs, nevertheless, are occurring over the catalyst and masks the conclusion that the catalyst bed is absorbing the reductant. When the high temperature catalyst is upstream of the low temperature catalyst as shown in FIG. 1B, then the high temperature catalyst effectively blocks the ammonia from reaching the low temperature catalyst.

As noted in the Background, moving low temperature SCR catalyst 5B in front of high temperature SCR catalyst 5A will not provide a solution in the FIG. 1B prior art arrangement because operating temperatures will exceed the catalytically active temperature of low temperature SCR catalyst 5B. Oxidation reactions will occur and produce either free nitrogen or, depending on the temperature, $NO_x$. Significantly, the reductant is removed from the exhaust stream reducing the effectiveness of the second catalyst. The invention is schematically illustrated in FIG. 2.

Figure 2:
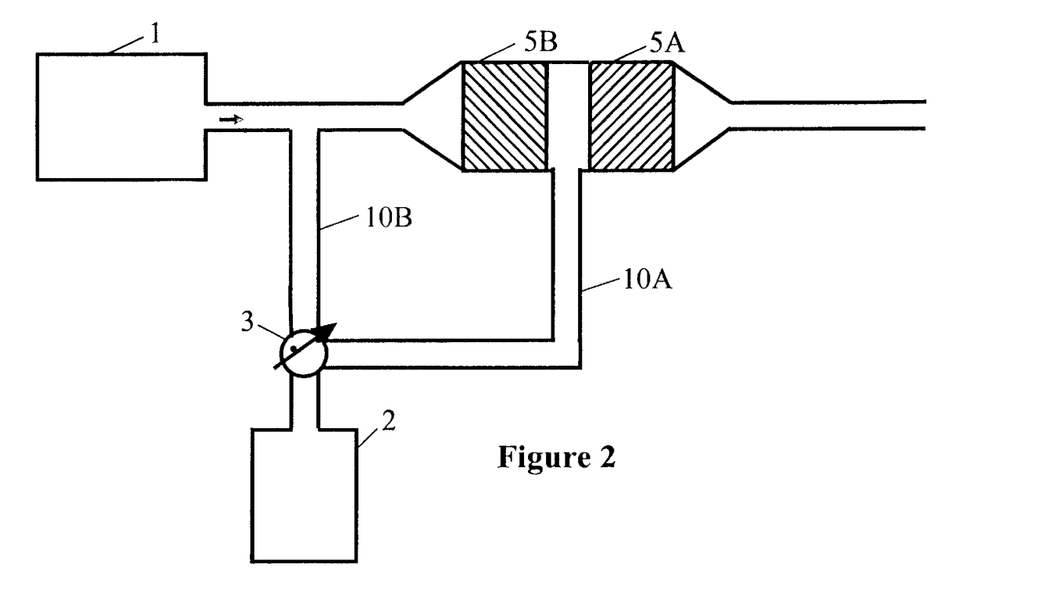
FIG. 2 is a block schematic diagram of the present invention similar in detail to that of prior art diagrams FIGS. 1A and 1B.

Referring now to FIG. 2, a separate duct 10A is provided establishing fluid communication with high temperature SCR catalyst 5A and a low temperature duct 10B is provided in fluid communication with low temperature SCR catalyst 5B. Metering valve is changed to a bi-directional metering valve to establish metered flow communication from reducing tank 2 to i) high temperature SCR catalyst 5A via high temperature duct 10A or ii) low temperature SCR catalyst 5B via low temperature duct 10B or iii) to both high temperature SCR catalyst 5A and low temperature SCR catalyst 5B through high temperature duct 10A and low temperature duct 10B, respectively. Preferably, high and low temperature ducts 10A, 10B introduce the reductant upstream of their respective SCR catalysts. However, "upstream" is used in a generic sense and also covers direct injection into the brick or catalyst bed. More particularly, if the catalytic converter comprises several beds of different temperature SCR catalysts within one housing, i.e., a catalytic converter, the invention contemplates that the reductant can be directed to each catalyst bed at the leading edge thereof which injection would be deemed upstream of the catalyst.

While the prime force for developing the invention was to produce a system which fully realized the benefits of low temperature SCR catalysts during the warm up period of the engine so that the proposed emissions standards can be met, especially for diesel and lean burn gasoline engines, the system is a temperature responsive system. It has specific application after engine 1 has reached operating temperature when a variety of operating loads placed on the engine affects its operating temperature which, in turn, affects the temperature of the SCR catalyst. For all practical purposes, the system is based on the temperature of the catalyst bed once the space velocity of the exhaust gas and the emission content within the gases is known or estimable. Further, the temperature within the bed can vary for a number of reasons. However, for purposes of this invention, and given the fact that the SCR catalysts are effective over a temperature range, a single temperature will be used. It is to be recognized that the relatively large mass of the catalyst bed as well as the mass of the emission system, the engine, and the speed of the exhaust gases initially result in the catalyst bed acting as a heat sink after cold start and during the time the engine begins to warm up. However, once the system is at operating temperature, the catalysts beds act as heat exchangers between the exhaust bed and the exhaust gas. The invention utilizes multiple injectors within the catalyst bed with injection of the reductant into those catalyst beds which are at catalytically active temperatures. The system heat considerations must be considered when sequencing the injection of the reductant in accordance with the invention. This concept is made clear in FIG. 6.

Figure 6:
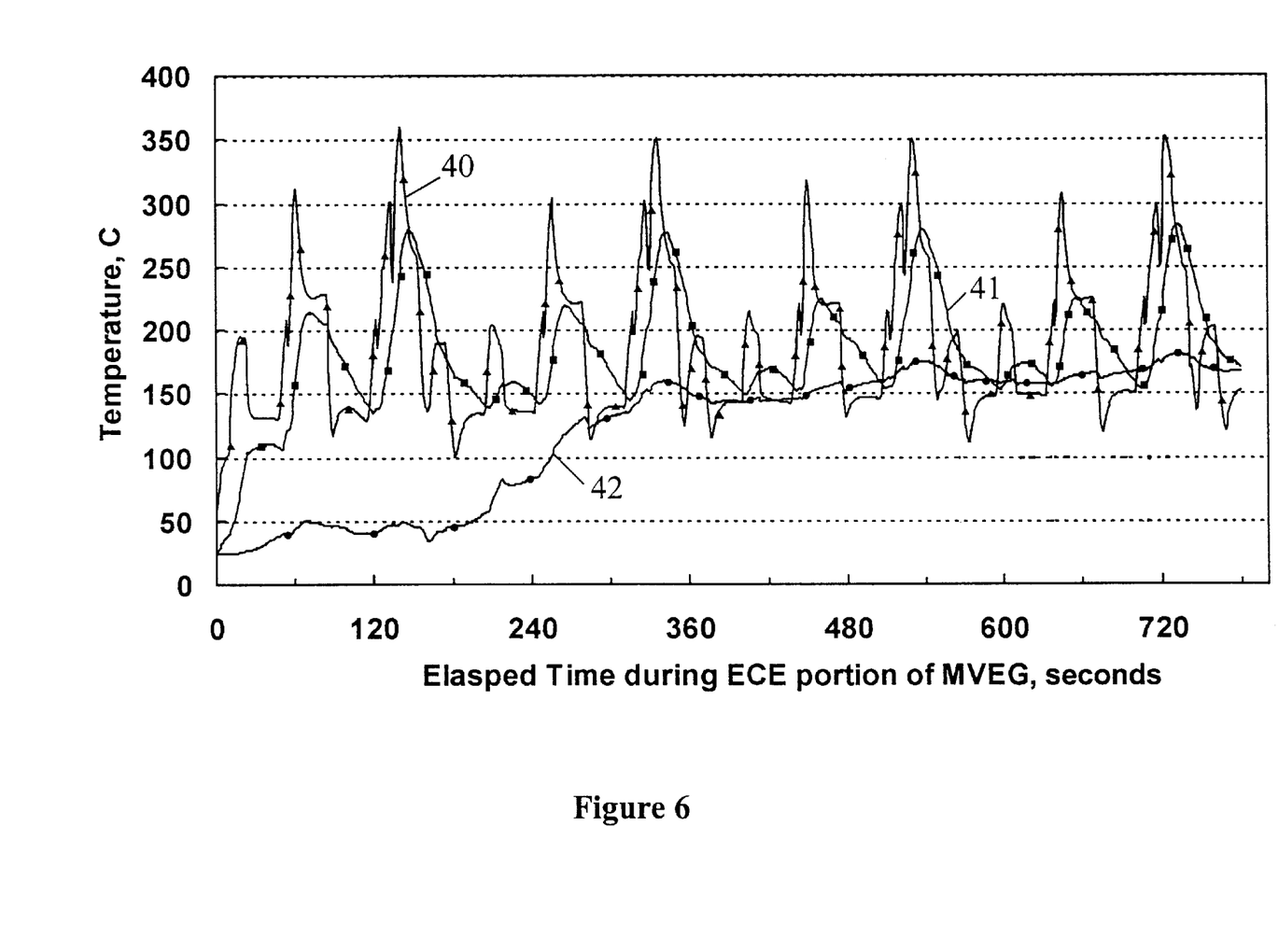
FIG. 6 is a graph showing temperature out readings at select positions in the exhaust system during the start portion of a MVEG drive cycle.

Referring now to FIG. 6, there is shown several plots of exhaust gas temperatures taken at various positions within the emission system during the city/urban portion of the MVEG drive cycle, and particularly, that portion of the drive cycle commencing with cold-start for some period of time shown on the x-axis with the exhaust gas temperature plotted on the y-axis. Under these conditions, the temperature of the exhaust gas downstream of engine 1 and upstream of high temperature SCR catalyst 5A is shown as the trace passing through triangles and designated by reference numeral 40 in FIG. 6. The temperature of the exhaust gas at the exit of high temperature SCR catalyst 5A is shown by the trace passing through squares and designated by reference numeral 41 in FIG. 6. The temperature of the exhaust gas at the exit of low temperature SCR catalyst 5B is shown by the trace passing through circles and designated by reference numeral 42 in FIG. 6. The change in the catalyst from a heat sink to a heat exchanger is clearly shown by trace 42 which is affected by both catalyst masses 5A, 5B. Some conclusions can be drawn with respect to FIG. 6. First, a normal injection routine during warm up would comprise injecting a reductant through duct 10B to low temperature SCR catalyst 5B and then, during some transition time or transition temperature range, injecting a reductant through both high temperature and low temperature SCR catalysts 5A, 5B followed by injecting a reductant only to high temperature SCR catalyst 5A. Further, FIG. 6 illustrates that the invention has application even to the FIG. 1A prior art arrangement whereas only one catalyst bed 5 is used. The temperature distribution within the bed will vary as generally indicated by FIG. 6 and the reductant can be injected into that portion of the bed at optimum temperature to avoid ammonia oxidation in the very hot regions of the catalyst bed and ammonia absorption in very cold regions of the bed. A single SCR catalyst formulation can thus realize the benefits of the invention.

The benefits of the invention are illustrated in the table below which measured the $NO_x$ conversion of the FIG. 1 prior art arrangement compared to the inventive arrangement illustrated in FIG. 2. An MVEG drive cycle was conducted on the same catalyst described with reference to FIGS. 4, 5 and 6, with the same engine and included the simulated city/urban driving (ECE) and simulated highway driving (EUDC) portions of the MVEG drive cycle. The data shows, as expected, a significant increase in the city/urban drive cycle and also an increase in the highway drive portion of the test.

|  | % $NO_x$ Conversion | | |
| --- | --- | --- | --- |
|  | ECE | EUDC | MVEG* (weighted average) |
| Single Injection Prior Art FIG. 1 | 16 | 66 | 45 |
| 2 Stage Inventive Injection FIG. 2 | 50 | 74 | 65 |

The invention has been specifically described to enable one skilled in the art to practice same. It should be clear that the ordering or the sequence in which the exhaust gas flows through multiple SCR catalysts is not important and that the benefits of the invention can be realized even if only a single catalyst having one bed is used.

Figure 2A:
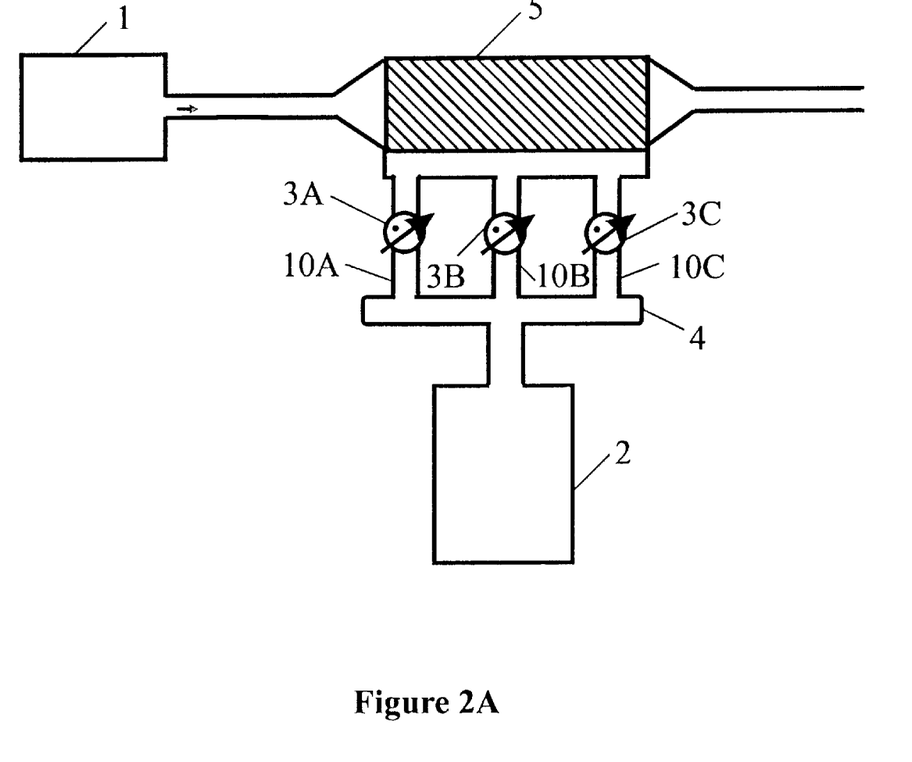
FIG. 2A is a block schematic diagram of an alternative embodiment of the invention similar in detail to that of prior art diagram FIGS. 1A and 1B.

Referring now to FIG. 2A, a general arrangement employing the invention in a single bed catalyst 5 is illustrated. In this diagrammatic arrangement, the reductant 2 leads to a manifold 4 in communication with an inlet duct 10A adjacent the inlet end of catalyst 5 for metering reductant to the catalyst inlet end through metering valve 3A. Manifold 4 is also in fluid communication with a mid-point duct 10B adjacent the middle portion of catalyst 5 for metering reductant to the mid section of catalyst 5 though metering valve 3B. Manifold 4 is also in fluid communication with an exit end duct 10C for metering reductant to the catalyst end portion through metering valve 3C. Metering valves 3A, 3B and 3C are actuated when the temperature of the corresponding catalyst bed portion(s) reach catalytically active valves. The catalyst bed temperatures can be directly sensed but, in practice, will be modeled through conventional algorithms using data obtained from several sensors. In the preferred embodiment, metering valves 3A, 3B and 3C are actuated at a set ratio in an "on-off" manner. However, it is within the broader scope of the invention to vary the ratio of the reductant as a function of the temperature of the catalyst bed as well as the other known functions which determine the ratio at which metering valves 3A, 3B and 3C are set, i.e., $NO_x$ content, mass flow, gas temperature, etc.

Figure 3:
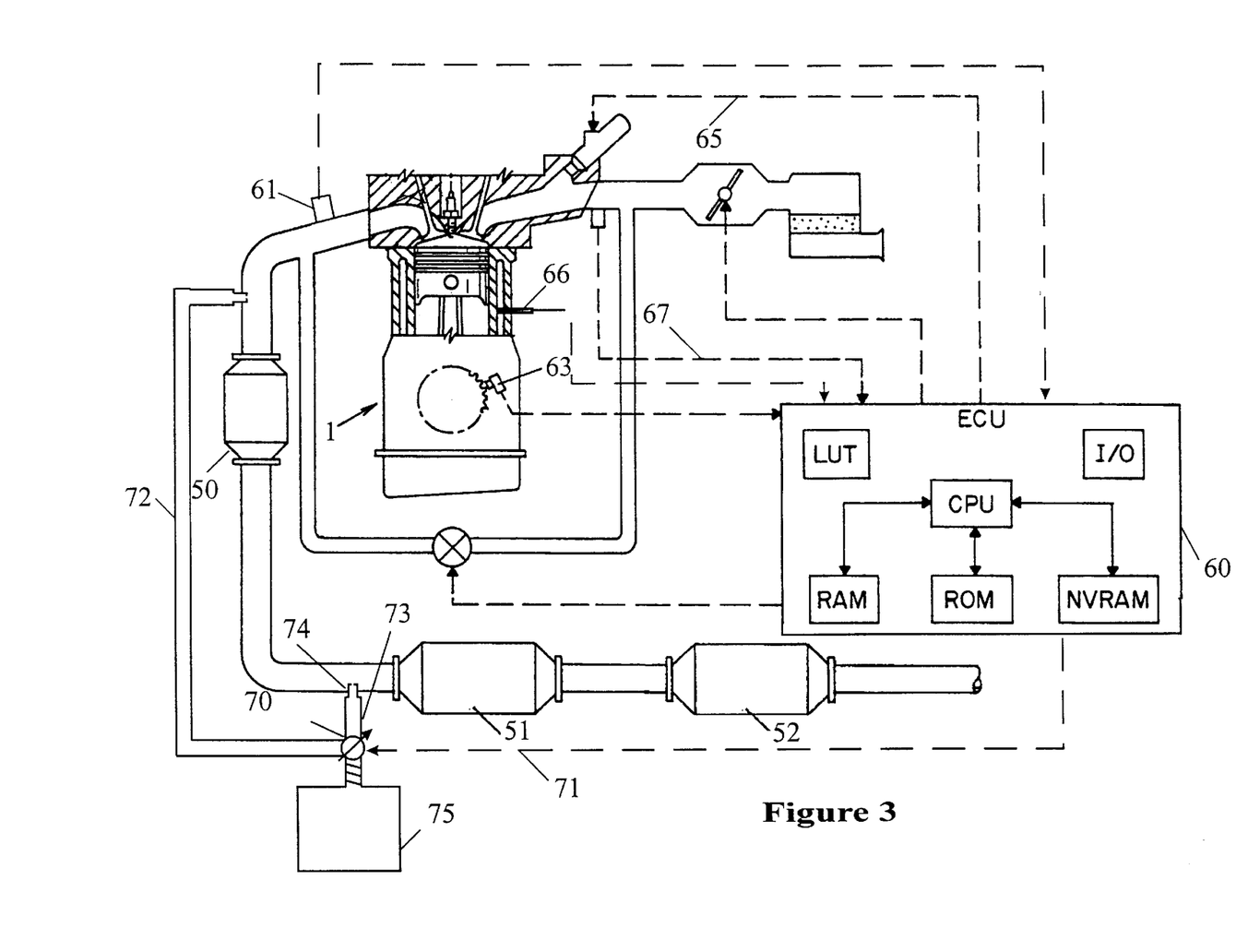
FIG. 3 is a block schematic diagram of the invention in greater detail than that shown in FIG. 2.

A more detailed schematic representing one particular catalytic arrangement is disclosed in FIG. 3. Referring now to FIG. 3, there is schematically illustrated a close-coupled SCR catalyst 50 which is a low temperature catalyst similar to low temperature SCR catalyst 5B discussed above. Downstream of close-coupled catalyst 50 is a high temperature catalyst 51 which is similar to high temperature SCR catalyst 5A. Downstream of high temperature SCR catalyst 51 is a conventional oxidation catalyst 52 for oxidizing HC, CO, etc.

Engine 1 is entirely conventional and is fitted with any number of sensors and actuators under the control of a conventional ECU (engine command unit) 60 which controls the operation of engine 1. For drawing illustration purposes only, the SCR system is shown in FIG. 3 as under the control of ECU 60. In practice, a similar device dedicated to controlling urea injection into the exhaust gas and preferably interfacing with ECU 60 is used. Alternatively, a stand alone processor with dedicated sensors and actuators can be employed. The acronym "ECU" will be used herein to mean all such arrangements.

ECU 60 (or urea control ECU) generates an output signal on line 71 regulating metering valve 70. Metering valve 70 not only variably meters the reducing agent or reductant but also directs the reductant to either close-coupled catalyst duct 72 or high temperature catalyst duct 73 or both as described above. Metering valve 70 can be any conventional valve known in the art, or alternatively, could comprise separate solenoid valves at each duct. Preferably, each duct 72, 73 terminates at an injector 74. The reducing agent is stored in tank 75. If the reductant is diesel fuel, the reducing tank 75 is the vehicle's fuel tank and the fuel pump in the vehicle can supply the pressure for the reductant.

Metering valve 70 is variably set by ECU 60 (or urea control ECU) to achieve the selective porting of the reductant at the desired rate. Generally, ECU 60 must have information indicative of the $NO_x$ content in the exhaust gas, the mass of the exhaust gas, and the temperature of the catalyst to variably control metering valve 70. In theory, the $NO_x$ content can be directly sensed by a $NO_x$ sensor shown as reference numeral 61. In practice, $NO_x$ sensors 61 do not commercially exist and $NO_x$ is modeled from several sensors and actuators such as the fuel setting for injector 65, mass air flow or pressure sensed by mass air flow sensor 67, and the engine torque or load as sensed by pick up 63. The exhaust gas mass can be ascertained from speed pick up 63 and mass air flow sensor 67. The temperature can be directly sensed by thermometers or alternatively, can be modeled using the ambient air temperature, engine coolant temperature from sensor 66 and, for start-up, fueling expended from cold-start. Algorithms based on mass heat transfer can then be employed to ascertain temperature. For example, see U.S. Pat. No. 5,765,370 to Hanafusa et al., incorporated herein by reference. Further and especially during cold start, it is possible to meter the reductant to the catalytically active SCR catalyst at the estimated temperature of the catalyst bed to further optimize performance of the catalyst.

The invention has been described with reference to a preferred embodiment. Obviously, alterations will occur to others skilled in the art upon reading and understanding the Detailed Description of the Invention. It is intended to include all such modifications and alterations insofar as they come within the scope of the present invention.

What is claimed is:

1. A method for converting NOx emissions in the exhaust gases of a vehicle powered by a diesel engine comprising the steps of:
   a) providing a first SCR catalyst catalytically active when its catalyst bed temperature is within a temperature range of a first low temperature to a first high temperature;
   b) providing a second SCR catalyst chemically different from the first SCR catalyst and catalytically active when its catalyst bed temperature is within a temperature range of a second low temperature to a second high temperature, the second low temperature being less than the first low temperature;
   c) sequentially passing the exhaust gas in any order from one of the SCR catalysts to the other SCR catalysts;
   d) metering a reductant selected from the group consisting of ammonia and an ammonia precursor(s) during warm-up of the engine to the second SCR catalyst until the first SCR catalyst bed is heated from ambient temperature to a temperature whereat it ceases to function as a heat sink; and,
   e) thereafter and during warm-up, metering the reductant to any one of the SCR catalysts having a catalytically active bed whereby oxidation of reductant and substantial retention of reductant on the catalyst bed is avoided.

2. The method of claim 1 further including the step of simultaneously metering the reductant to the first and second catalysts if both catalyst's beds are catalytically active.

3. The method of claim 2 wherein the first and second catalysts are combined into a single catalyst bed and the metering step directs reductant against that portion of the catalyst bed which has ceased to function after cold start as a heat sink and is at a catalytically active temperature.

4. The method of claim 2 wherein the metering reductant rate to any SCR catalyst is a variable rate determined as a function of the catalyst bed temperature, space velocity of the exhaust gas through the catalyst and quantity of NOx present in the exhaust gas.

5. The method of claim 2 further including an oxidation catalyst downstream of the second SCR catalyst for preventing ammonia slip.

6. The method of claim 2 wherein the first SCR catalyst is a noble metal catalyst deposited on a metal oxide support and the second catalyst comprises an oxide.

* * * * *